July 7, 1959 — G. F. LEWIS — 2,893,424
ANIMAL WATERING DEVICES
Filed Nov. 26, 1957 — 3 Sheets-Sheet 1

INVENTOR.
GERALD F. LEWIS
BY
ATTORNEY

July 7, 1959
G. F. LEWIS
2,893,424
ANIMAL WATERING DEVICES
Filed Nov. 26, 1957
3 Sheets-Sheet 2
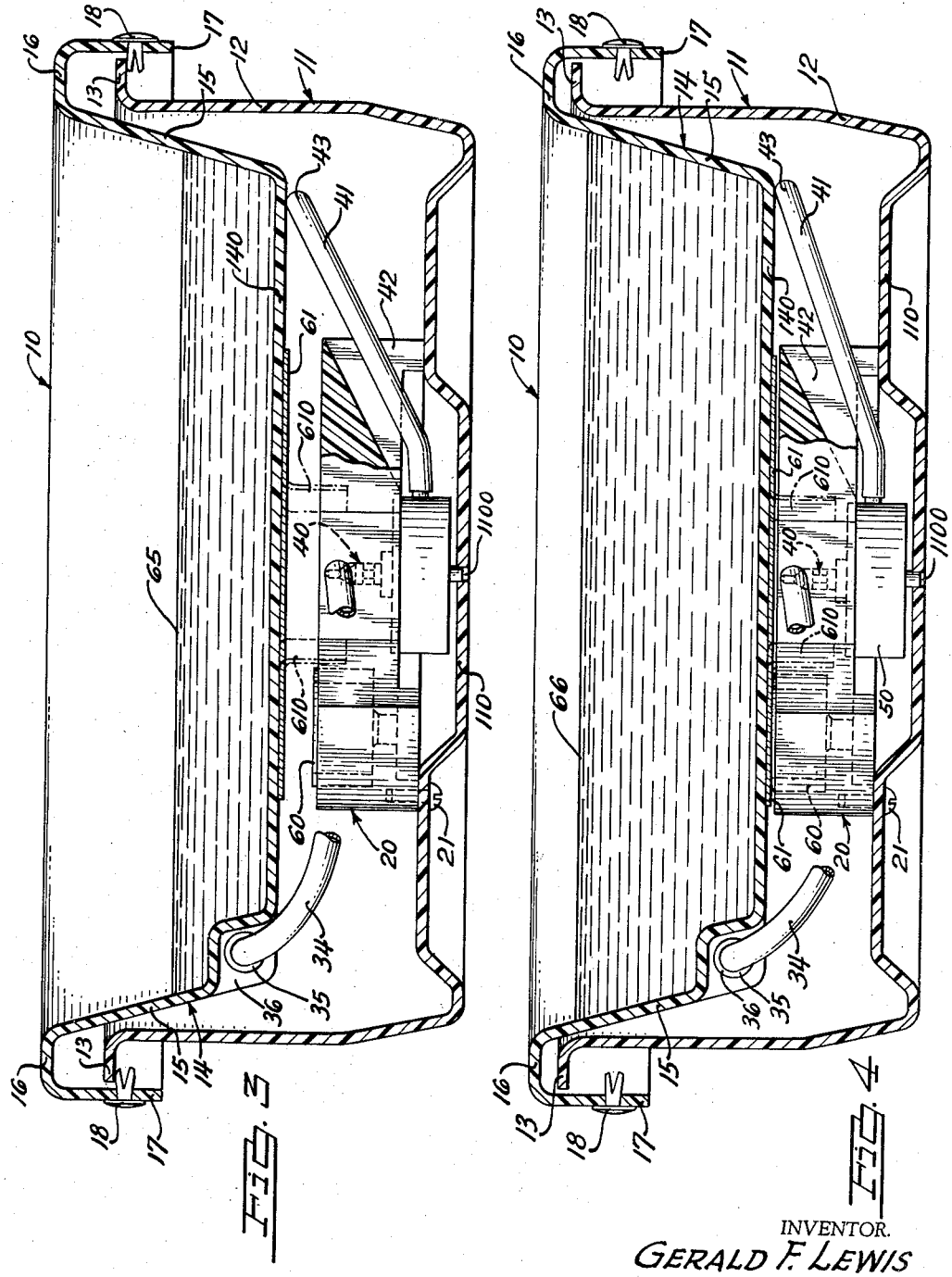
INVENTOR.
GERALD F. LEWIS
BY
ATTORNEY

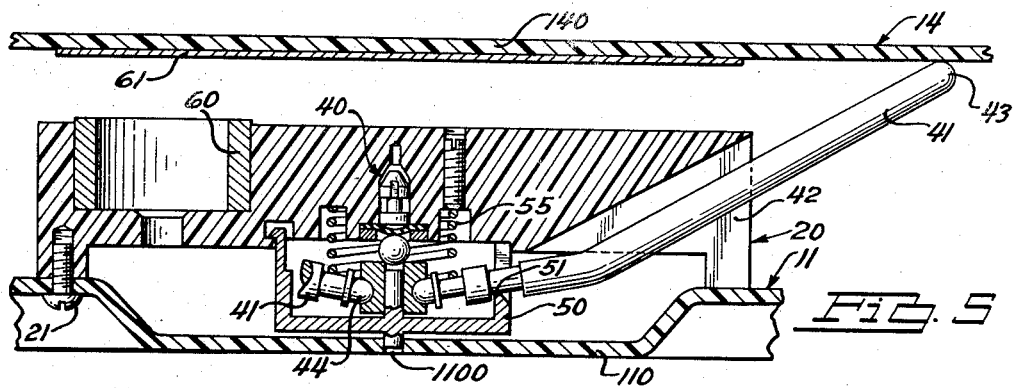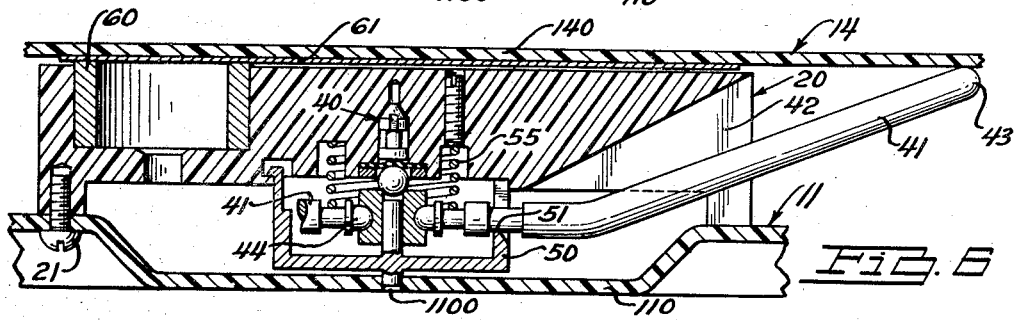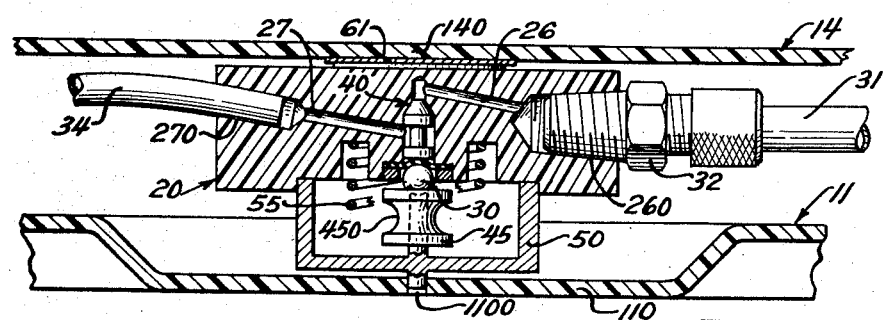

United States Patent Office 2,893,424
Patented July 7, 1959

2,893,424
ANIMAL WATERING DEVICES
Gerald F. Lewis, Berkley, Mich., assignor of one-half to George A. Jaroske, Grosse Pointe, Mich.

Application November 26, 1957, Serial No. 699,020

5 Claims. (Cl. 137—400)

This invention relates to animal watering devices of the type that will automatically provide a water supply for animals or birds by replenishment after depletion or evaporation of a portion of the normal amount of water made available in the dish or water receptacle thereof.

In the prior art there have been many and various types of animal watering devices for pets, farm animals and the like. However, none have proven completely satisfactory beacuse of the lack of accurate means for controlling the level of water in the dish or water receptacle of the device, and due to the fact that the pressure water supply shut-off means generally employed are not completely reliable.

With the foregoing in view, the primary object of the invention is to provide an improved positive acting animal watering device which maintains automatically a usable level of water in the dish or water receptacle thereof from a continuous pressure water supply by replenishment of water used or evaporated therefrom.

A further object of the invention is to provide an animal watering device comprising a dish or other water receptacle to which water is supplied from a pressure source under control of improved spring loaded lever operated valve means operable responsive to the amount of water in the receptacle, and means positively moving the said valve means to its fully closed position when said valve means closely approaches its said fully closed position.

Other objects of the invention will become apparent by reference to the following detailed description taken in connection with the accompanying drawings, in which:

Figs. 3 and 4 are sectional views of the animal watering device disclosed in Figs 1 and 2 with the water receptacle shown respectively in its partially filled and its completely filled position.

Fig. 5 is a somewhat enlarged fragmentary sectional view taken on the line 5—5 of Fig. 2 showing the water receptacle in its empty or partially filled positioned with the water supply valve open.

Fig. 6 is a sectional view similar to Fig. 5 except the water receptacle is shown in its completely filled position with the water supply valve fully closed.

Fig. 7 is an enlarged sectional view taken on the line 7—7 of Fig. 2 with the water receptacle shown in its completely filled position with the water supply valve fully closed.

Fig. 8 is a further enlarged sectional view similar to Fig. 6 showing in detail the improved valve operating and water receptacle supporting mechanism.

Figure 1:
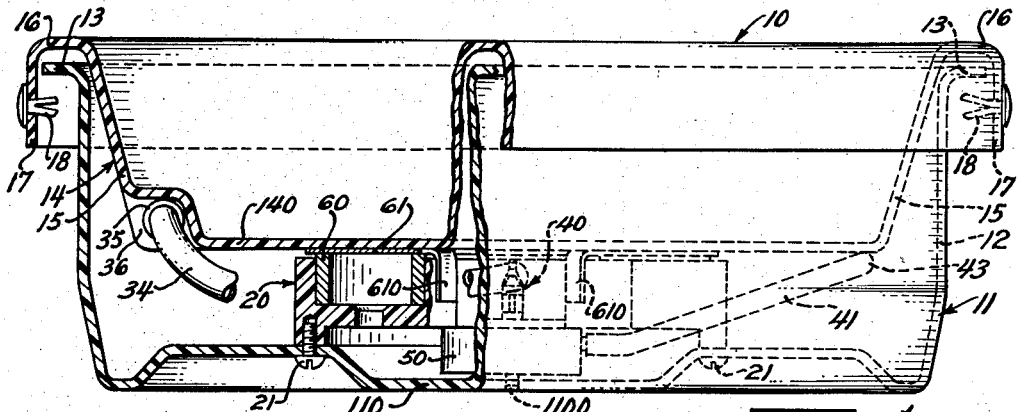
Fig. 1 is a view part in side elevation and part in section showing an animal watering device embodying the invention.

Referring now to the drawings wherein like numerals refer to like and corresponding parts throughout the several views, the particular embodiment of the animal watering device 10 disclosed herein for illustrative purposes is shown as a watering device for domestic pets such as dogs and cats; however, it is to be understood that animal watering devices of other sizes, shapes and detail embodying the invention may be employed for birds, chickens, turkeys, farm animals, and certain zoo animals.

The illustrative embodiment 10 of an animal watering device shown in the drawings consists generally of a bowl shaped base 11 having vertical walls 12 and an outwardly extending upper peripheral lip 13. A dish-like or open top water receptacle 14 having generally vertical outwardly sloping walls 15 mounted on said base for limited vertical reciprocating movement thereover. This may be accomplished by providing the said water receptacle 14 with an outwardly extending peripheral lip 16 extending over the peripheral lip 13 of the base 11 and terminating into a downwardly depending peripheral flange 17. Suitable pins or studs 18 are disposed through the said depending peripheral flange 17 of the receptacle 14 below the outwardly extending peripheral lip 13 of the base 11. The said pins or studs 18 function to maintain the receptacle 14 assembled onto the base 11 and simultaneously limit the upward movement of the said water receptacle 14 in respect thereto.

The base 11 is preferably provided with an upwardly extending hub 20 fixed thereto by suitable studs 21. The elevation of the top of the said hub 20 is such as to limit the downward movement of the water receptacle 14 in respect to the said base 11. The bottom of the said hub 20 is preferably spaced above the bottom 110 of the base 11 to accommodate a valve means 40 and valve operating mechanism for controlling the flow of water to the water receptacle 14, all as hereinafter described in detail. Obviously, other and equivalent base elements with vertically reciprocating water receptacles mounted thereon for limited vertical movement with respect thereto may be employed.

The said valve means generally designated by the numeral 40 controls the flow of water from a pressure source S to the open water receptacle 14, and is preferably constructed as follows. The hub 20 is provided with a central valve bore 22 and valve diaphragm counterbore 23 as indicated in the drawings and as best shown in Fig. 8, the said valve bore 22 forming a frusto-conical valve seat 24. Reciprocatingly mounted in the said valve bore 22 is a suitable valve spool 25 formed to seat on the valve seat 24 when mechanically urged upwardly as shown in Figs. 6, 7 and 8. The said valve spool 25 permits water to flow from the pressure inlet port 26 to the pressure outlet port 27 when hydraulically urged downwardly as shown in Fig. 5. A pliable diaphragm 28 of rubber, neoprene or the like is installed in the counterbore 23 over the lower end of the valve bore 22 and is held in scaled relationship within the said counterbore 23 by a suitable retainer ring 29 pressed or otherwise secured therein. The inner annulus of the said retainer ring 29 serves as a retainer and guide for a valve thrust ball 30 which flexes the diaphragm 28 and moves the valve spool 25 upwardly as viewed in Figs. 6, 7 and 8 against water pressure to close the said valve 40 whereby to shut off the flow of water from the water pressure source S to the water receptacle 14.

Figure 2:
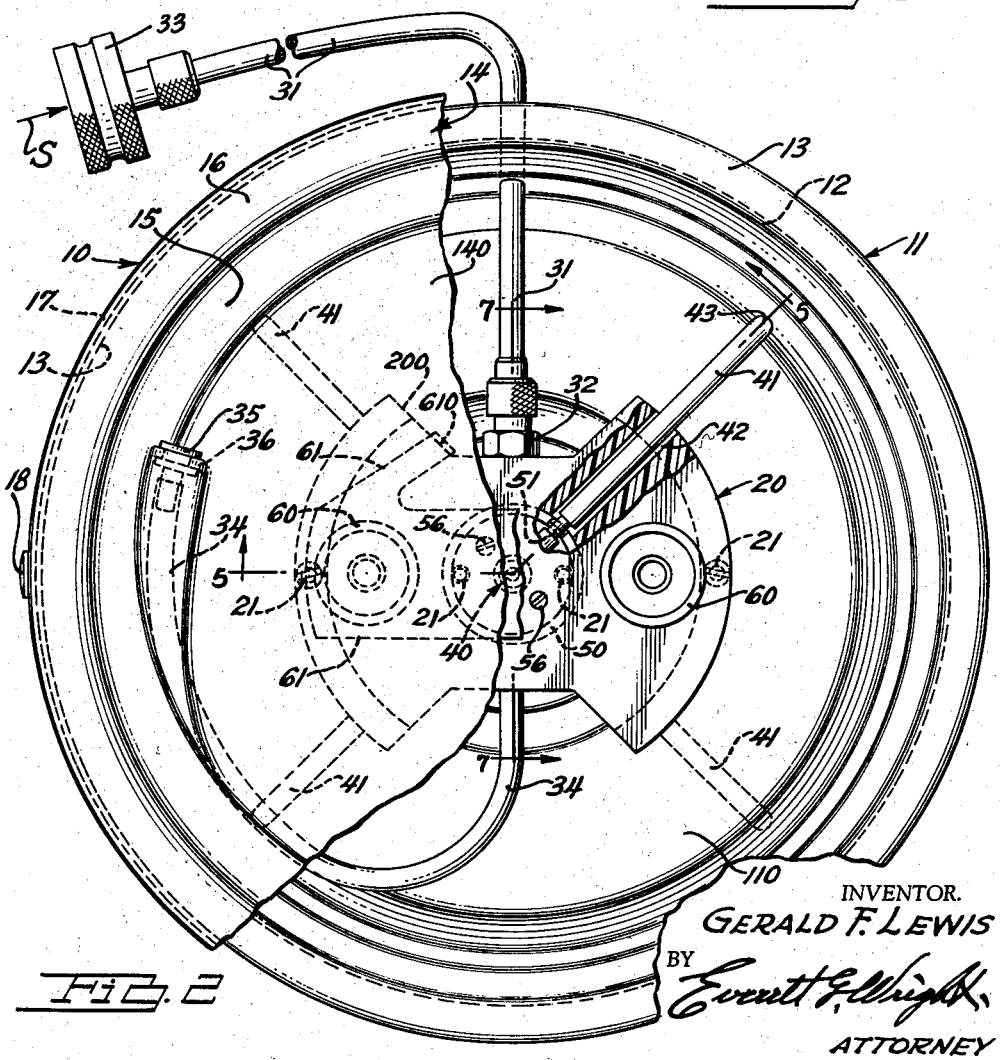
Fig. 2 is a top plan view with portions broken away to better illustrate the construction.

Water from the water pressure source S such as a hose bib or the like flows through a suitable hose 31 having a hose bib coupling 33 on the source end thereof and a coupling 32 on the discharge end thereof threaded into the hub 20 at 260 in communication with the pressure inlet port 26 of the valve 40. The outlet port 27 of the said valve 40 is enlarged at 270 to accommodate one end of a flexible tube or hose 34 which is cemented or otherwise fixed therein. The said flexible hose 34 communicates with the interior of the water receptacle 14 through a suitable filler fitting 35 extending through a radially disposed vertical wall 36 preferably provided adjacent the bottom thereof as indicated in Figs. 1 and 2. Such location of the filler fitting 35 causes water to enter the water receptacle 14 at or near the juncture of the bottom 140 and the wall 15 thereof and be directed in a swirling motion peripherally therearound.

The water receptacle 14 is supported on the outer ends of a plurality of radially disposed pivoted valve operating and receptacle supporting arms 41 which extend from the hub 20 of the base 11. Guide slots 42 are provided in the said hub 20 to maintain the said pivoted valve operating and receptacle supporting arms 41 in proper operating radial alignment. Each pivoted arm 41 is preferably formed with an outer semispherical end 43 which contacts the bottom 140 of the water receptacle 14. The inner end of each pivoted arm 41 is also semispherically formed at 44 to engage a vertically reciprocating cylindrical valve operating element 45 at a circumferential groove 450 formed therearound. The said pivot arm 41 is cylindrically notched near the inner end thereof to provide a spring seat 46 and a fulcrum seat 47.

The lower portion of the hub 20 is provided with a plurality of circumferentially spaced notches 48 with a lip 480 thereat to receive and centrally support a fulcrum cup 50 in depending relationship therefrom on suitable tabs 500. The said fulcrum cup 50 is provided with a plurality of fulcrums 51 suitably spaced around the periphery thereof, one for each pivoted arm 41 which is pivoted thereon at the fulcrum seat 47 thereof. The said fulcrum cup 50 is preferably provided with an upwardly disposed central stem 52 onto which the cylindrical valve operating element 45 is reciprocatingly mounted. The said fulcrum cup 50 also has a short central depending stem 53 which telescopes into a central aperture 1100 provided in the bottom 110 of the base 11 to maintain the said fulcrum cup 50 central in in respect thereto. The said lower portion of the hub 20 is also provided with a downwardly facing axially disposed spring groove 54 into which the upper end of a compression spring 55 is positioned. The lower end of the said compression spring 55 seats on the spring seats 46 of the pivot arms 41. The said spring 55 acting on the spring seats 46 of the pivoted valve operating and receptacle supporting arms 41 pivots them about the fulcrums 51 and causes them to lift the water receptacle 14 upwardly to its empty or partially filled position as shown in Figs. 3 and 5. Suitable spring adjusting screws 56 may be provided in the hub 20 by means of which the compressive or lifting force of the spring 55 may be adjusted to assure proper operation of the animal watering device 10.

The valve thrust ball 30, which flexes the diaphragm 28 and moves the valve spool 25 upwardly as viewed in Figs. 6, 7 and 8 against water pressure to close the valve 40, is supported at and carried by the top of the cylindrical valve operating element 45 and is lifted and retracted thereby responsive to the vertical reciprocating movement of the said valve operating element 45 on the said upwardly disposed central stem 52 of the fulcrum cup 50. The said valve operating element is moved upwardly and downwardly by the inner spherical ends 44 of the pivoted valve operating arms 41 which support the water receptacle 14 on the outer ends thereof responsive to the amount of water in the receptacle 14.

Inserted and fixed in the top of the hub 20 of the base 11 are a pair of diametrically located vertically disposed permanent magnets 60, the tops of which preferably extend slightly above the top of the said hub 20. A magnet armature plate 61 is fixed to the bottom 140 of the water receptacle 14. Downwardly depending ears 610 of the armature plate 61 cooperate with suitable vertically disposed surfaces 200 of the hub 20 to maintain the armature plate 61 of the receptacle 14 properly oriented over the said permanent magnets 60.

When the weight of water entering the receptacle 14 through the filler fitting 35 causes the compression spring 55 to compress, the bottom of the receptacle 14 moves under the weight of water filling it downwardly from an empty or partially filled position as shown in Figs. 1 and 5 toward and in close proximity to its completely filled position shown in Figs. 1, 4, 6, 7 and 8. The permanent magnets 60 then act upon the magnet armature 61 fixed to the bottom of the receptacle 14 with sufficient force to further and abruptly compress the said compression spring 55 which causes the said receptacle 14 to move rapidly and firmly downwardly to the limit of its downward movement which depresses the outer ends of the pivoted valve operating and receptacle supporting arms 41 to the extent that the inner ends thereof lift the cylindrical valve operating element 45 and the valve thrust ball 30 thereon to flex the diaphragm 28 upwardly and move the valve spool 25 from its open position shown in Fig. 5 to its closed position shown in Figs. 6, 7 and 8, thereby quickly and positively closing the valve 40 and shutting off the flow of water entering the receptacle 14 through its filler fitting 35. The spring adjusting screws 56 are preferably set so that the partially filled and completely filled levels of water in the receptacle 14 are substantially as indicated by the numerals 65 and 66 in Figs. 3 and 4 respectively.

With the foregoing construction, the strength and adjustment of the compression spring 55 determines the amount of water required in the receptacle 14 to close the valve 40 and to shut off water being supplied to the water receptacle 14. The magnetic means assures a positive shut-off of the valve 40. The magnets 60 are of sufficient strength to pull the receptacle 14 downwardly against the compressive force of the compression spring 55 when the armature 61 on the bottom of the water receptacle 14 closely approaches the limit of its downward movement. Thusly, a positive force holds the water receptacle 14 down and the valve 40 closed until such a time as a sufficient amount of water is removed by use or evaporation from the water receptacle 14 to permit the compression spring 55 to overcome the magnetic pull of the permanent magnets 60 and lift the water receptacle 14 through the receptacle supporting arms 41 which simultaneously permit the valve 40 to open responsive to water pressure on the upper end of the valve spool 25 causing the receptacle to be refilled.

Although but a single embodiment of the invention has been disclosed and described herein for illustrative purposes, it is obvious that many changes may be made in the size, shape, arrangement and detail of the various elements of the invention without departing from the spirit or scope thereof as defined by the appended claims.

I claim:

1. An animal watering device comprising a base, a receptacle mounted for limited vertical reciprocating movement thereon, central annularly disposed fulcrums on said base, more than two radially disposed pivoted lever arms supporting said receptacle on their outer ends pivoted adjacent their inner ends on said fulcrums, spring means acting downwardly on said lever arms inwardly of said fulcrums normally lifting said receptacle but permitting said receptacle to move downwardly responsive to a predetermined weight of water entering it, means providing a flow of water under pressure to said receptacle, and normally open hydraulic valve means including a valve spool centrally fixed on said base operable by said lever arms responsive to vertical movement of said receptacle to close responsive to downward movement of said receptacle, and diaphragm means adjacent one end of said valve spool moving it to close said valve means responsive to said vertical movement of said lever arm.

2. An animal watering device comprising a base, a receptacle mounted for limited vertical reciprocating movement thereon, centrally annularly disposed fulcrums on said base, pivoted lever arms supporting said receptacle on said base on their outer ends and pivoted adjacent their inner ends of said fulcrums, spring means acting on said lever arms inwardly of said fulcrums normally lifting said receptacle but permitting said receptacle to move downwardly responsive to the weight of water entering it, reciprocating hydraulically opened valve means through which a flow of water under pressure normally enters said receptacle when said receptacle is lifted by said spring loaded lever arms, and a valve operating means vertically reciprocable in respect to said base engaged by the inner ends of said pivoted lever arms to close said valve means responsive to downward vertical movement of said receptacle thereby shutting off the flow of water to said receptacle responsive to downward movement thereof.

3. An animal watering device comprising a base element and an open top water receptacle mounted on said base for limited vertical reciprocating movement therover, a hub in said base limiting the downward movement of said receptacle, means supplying water under pressure to said receptacle through said hub, hydraulically opened reciprocating valve means in said hub controlling the flow of water into said receptacle, annuarly disposed fulcrums in said hub, valve operating arms pivoted on said fulcrums supporting said receptacle on the outer ends thereof, a valve operating element reciprocatingly mounted on said hub adapted to be engaged by the inner ends of said pivoted arms to close said valve means responsive to the filling of said receptacle to a predetermined level, spring means acting on said pivoted arms constantly urging said receptacle to move toward its upper limit of movement simultaneously moving said reciprocating valve operating element to open said valve and permit said receptacle to fill with water to said predetermined level, the weight of said water entering said receptacle overcoming said spring means causing said pivoted arms to move the said reciprocating valve operating element in a direction to close said valve, permanent magnet means in said hub, a magnet armature fixed to the bottom of said receptacle in registry with said magnet means, the said magnet means pulling said receptacle downwardly in aid of the weight of water entering said receptacle when said receptacle has moved downwardly and the said armature becomes in close proximity to said magnet means whereby to accomplish a rapid and positive closing of said valve as said water receptacle becomes substantially filled.

4. An animal watering device comprising a base, a receptacle mounted for limited vertical reciprocating movement thereon, central annularly disposed fulcrums on said base, pivoted lever arms supporting said receptacle on said base on their outer ends and pivoted adjacent their inner ends on said fulcrums, spring means acting on said lever arms inwardly of said fulcrums normally lifting said receptacle but permitting said receptacle to move downwardly responsive to the weight of water entering it, means providing a flow of water under pressure to said receptacle, normally hydraulically open valve means centrally fixed on said base controlling the flow of water to said receptacle, said valve means including a valve chamber having inlet and outlet passages and a valve spool seatable at one end thereof to close said valve, a diaphragm in the wall of said valve chamber opposite the other end of said valve spool, and a valve operating means including a spool with a ball thereon reciprocably mounted on said base, said lever arms lifting said valve operating means causing said ball to flex said diaphragm and move said valve spool to seat the same responsive to downward movement of said receptacle, the weight of said water entering said receptacle overcoming said spring means causing said pivoted arms to move the said reciprocating valve operating means in a direction to close said valve, permanent magnet means in said hub, a magnet armature fixed to the bottom of said receptacle in registry with said magnet means, the said magnet means pulling said receptacle downwardly in aid of the weight of water entering said receptacle when said receptacle has moved downwardly and the said armature becomes in close proximity to said magnet means whereby to accomplish a rapid and positive closing of said valve as said water receptacle becomes substantially filled.

5. In a receptacle mounted for limited movement movable in one direction by gravity responsive to being filled with fluid to a predetermined level, spring means moving the said receptacle in the opposite direction when said receptacle is less than full, conduit means providing a flow of fluid under hydraulic pressure from a fluid source to said receptacle to fill the same, a valve housing having a passage therethrough including a valve bore series connected with said conduit means, a valve seat formed in said housing concentric with said valve bore, a reciprocating valve element in said valve bore seatable on said valve seat normally moved to an unseated position under hydraulic pressure permitting fluid to flow from said fluid source into said receptacle, said valve bore having an open end opposite said valve seat, a diaphragm sealing said open end of said valve bore, said valve element being disposed adjacent said diaphragm when said valve element is in its normally open position, and means movable by said receptacle adapted to depress said diaphragm and move said valve element to seat and close said valve when said receptacle is filled to said predetermined level.

References Cited in the file of this patent
UNITED STATES PATENTS

| | | |
|---|---|---|
| 745,099 | Fambrough | Nov. 24, 1903 |
| 1,631,406 | Eisenhauer | June 7, 1927 |
| 2,415,660 | Stettner et al. | Feb. 11, 1947 |
| 2,497,223 | Landon | Feb. 14, 1950 |
| 2,590,266 | Nelson | Mar. 25, 1952 |
| 2,614,572 | Wisney | Oct. 21, 1952 |
| 2,626,631 | Hotton et al. | Jan. 27, 1953 |